(12) United States Patent
Zhao et al.

(10) Patent No.: US 10,273,928 B1
(45) Date of Patent: Apr. 30, 2019

(54) MODEL-BASED COMBUSTION TIMING AND TORQUE CONTROL FOR INTERNAL COMBUSTION ENGINE ASSEMBLIES

(71) Applicant: GM Global Technology Operations LLC, Detroit, MI (US)

(72) Inventors: Junfeng Zhao, Troy, MI (US); Jun-mo Kang, Ann Arbor, MI (US); Yiran Hu, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/796,019

(22) Filed: Oct. 27, 2017

(51) Int. Cl.
  *F02P 5/14* (2006.01)
  *F02P 5/15* (2006.01)
  *F02D 37/02* (2006.01)

(52) U.S. Cl.
  CPC ............ *F02P 5/1502* (2013.01); *F02D 37/02* (2013.01); *F02P 5/142* (2013.01); *F02D 2250/18* (2013.01)

(58) Field of Classification Search
  CPC ........ F02P 5/142; F02P 5/1502; F02P 5/1504; F02P 5/153; F02D 37/02; F02D 2250/18
  USPC ....................................... 123/406.23, 406.47
  See application file for complete search history.

(56) References Cited

U.S. PATENT DOCUMENTS

| | | | |
|---|---|---|---|
| 6,994,072 B2 | 2/2006 | Kuo et al. | |
| 7,128,047 B2 | 10/2006 | Kuo et al. | |
| 7,367,313 B2 | 5/2008 | Chang et al. | |
| 7,689,343 B2 | 3/2010 | Dagci et al. | |
| 7,725,244 B2 | 5/2010 | Itoga et al. | |
| 8,000,882 B2 | 8/2011 | Ramappan et al. | |
| 8,210,158 B2 | 7/2012 | Kang et al. | |
| 8,316,818 B2 | 11/2012 | Ramappan et al. | |
| 8,347,860 B2 | 1/2013 | Kang et al. | |
| 8,776,737 B2 | 7/2014 | Bayer et al. | |
| 9,074,551 B2 | 7/2015 | Yun et al. | |
| 9,689,321 B2 | 6/2017 | Kang et al. | |
| 9,689,339 B2 | 6/2017 | Kang et al. | |
| 9,714,616 B2 * | 7/2017 | Jin | F02D 28/00 |
| 9,903,287 B2 * | 2/2018 | Kitagawa | F02D 35/023 |
| 9,903,302 B2 * | 2/2018 | Kitagawa | F02D 41/30 |
| 9,920,697 B2 * | 3/2018 | Pochner | F02D 9/02 |
| 9,976,534 B2 * | 5/2018 | Furuishi | F02P 5/045 |
| 10,094,300 B2 * | 10/2018 | Cygan, Jr. | F02D 13/0207 |

(Continued)

*Primary Examiner* — Erick R Solis
(74) *Attorney, Agent, or Firm* — Quinn IP Law (57) ABSTRACT

Disclosed are model-based combustion timing systems and control logic for engine assemblies, methods for making/operating such engine assemblies, and motor vehicles with spark-ignited engine assemblies implementing model-based combustion timing. A method for controlling torque output of an engine assembly includes receiving a requested torque demand for the engine, and determining a current fuel command and valve timing for the engine's power cylinder(s). A first math model is used to determine a desired CA50 based on the requested torque demand, a power cylinder indicated mean effective pressure (IMEP), an expander cylinder IMEP, and the current fuel command/valve timing. A second math model is used to determine a maximum brake torque (MBT) CA50 based on power cylinder and expander cylinder IMEPs, and current fuel command/valve timing. An engine control unit determines a final spark timing based on a correlation between the desired CA50 and MBT CA50, modified by a spark timing gain.

20 Claims, 4 Drawing Sheets

(56) References Cited

U.S. PATENT DOCUMENTS

| | | |
|---|---|---|
| 2010/0294232 A1 | 11/2010 | Otterstrom |
| 2013/0080026 A1 | 3/2013 | Kang et al. |
| 2016/0222872 A1 | 8/2016 | Durrett et al. |
| 2016/0258410 A1 | 9/2016 | Cygan, Jr. et al. |

* cited by examiner

MODEL-BASED COMBUSTION TIMING AND TORQUE CONTROL FOR INTERNAL COMBUSTION ENGINE ASSEMBLIES

INTRODUCTION

The present disclosure relates generally to internal combustion engine (ICE) assemblies. More specifically, aspects of this disclosure relate to automated combustion timing and control strategies for reciprocating-piston type internal combustion engines.

Current production motor vehicles, such as the modern-day automobile, are originally equipped with a powertrain that operates to propel the vehicle and power the onboard vehicle electronics. In automotive applications, for example, the vehicle powertrain is generally comprised of a prime mover that delivers driving power through a multi-speed power transmission to the vehicle's final drive system (e.g., differential, axle, and road wheels). Automobiles have traditionally been powered by a reciprocating-piston type internal combustion engine because of its ready availability and relatively inexpensive cost, light weight, and overall efficiency. Such engines include two and four-stroke compression-ignited diesel engines, four-stroke spark-ignited gasoline engines, six-stroke architectures, and rotary engines, as some non-limiting examples. Hybrid vehicles, on the other hand, utilize alternative power sources, such as battery-powered or fuel-cell-powered electric motors, to propel the vehicle, minimizing reliance on a fossil-fuel based engine for power and, thus, increasing overall fuel economy.

A common overhead valve internal combustion engine includes an engine block with cylinder bores each having a piston reciprocally movable therein. Coupled to a top surface of the engine block is a cylinder head that cooperates with the piston and cylinder bore to form a variable-volume combustion chamber. These reciprocating pistons are used to convert pressure, generated by igniting a fuel-and-air mixture in the combustion chamber, into rotational forces to drive the engine's crankshaft. The cylinder head defines intake ports through which air, provided by an intake manifold, is selectively introduced into each combustion chamber. Also defined in the cylinder head are exhaust ports through which exhaust gases and byproducts of combustion are selectively evacuated from each combustion chamber to an exhaust manifold. The exhaust manifold, in turn, collects and combines the exhaust gases for recirculation into the intake manifold, delivery to a turbine-driven turbocharger, or evacuation from the ICE via an exhaust system.

A commonly available cylinder head (or heads, if the engine has multiple banks of cylinders) houses the ICE's valve train, which may include inlet valves, exhaust valves, rocker arms, pushrods, and, in some instances, one or more camshafts. The valve train is part of the powertrain subsystem responsible for controlling the amount of fuel-entrained air entering and combustion-related exhaust gases exiting the engine's combustion chambers at any given point in time. Engine torque and power output is varied by modulating valve lift and timing, which is accomplished by driving the inlet and exhaust valves, either directly or indirectly, by cam lobes on a rotating camshaft. Different engine speeds typically require different valve timing and lift for optimum performance. Generally, low engine speeds require valves to open a relatively small amount over a shorter duration, while high engine speeds require valves to open a relatively larger amount over a longer duration for optimum performance.

Four-stroke spark-ignition (SI) engines commonly operate—as the name suggests—in four distinct stages or "strokes" to drive the engine's crankshaft. At one such (first) stage of operation, identified as the "intake stroke," a metered mixture of fuel and air is introduced into each cylinder as the corresponding piston travels rectilinearly from top-to-bottom along the length of the cylinder bore. Valve train intake valves are opened such that a vacuum pressure gradient generated by the downward-travelling piston draws fuel and air into the combustion chamber. During a subsequent (second) stage, labelled the "compression stroke," the intake and exhaust valves are closed as the piston travels from bottom-to-top and compresses the fuel-air mixture. Upon completion of the compression stroke, another (third) stage or "power stroke" commences and a spark plug ignites the compressed fuel and air, with the resultant explosive expansion of gases pushing the piston back to bottom dead center (BDC). During a successive stage—more commonly referred to as the "exhaust stroke"—the piston once again returns to top dead center (TDC) with the exhaust valves open; the travelling piston expels the spent air-fuel mixture from the combustion chamber. The four strokes of a single working (Otto) cycle requires two revolutions of the crankshaft to complete.

SUMMARY

Disclosed herein are model-based combustion timing systems with attendant control logic for internal combustion engine assemblies, methods for making and methods for operating such engine assemblies, and motor vehicles with spark-ignited engines having model-based combustion timing control capabilities. By way of example, there is presented a novel model-based torque control system for a spark-ignited (SI) Downsized Boosted Diluted Combustion (DBDC) Exhaust Compound (EC) engine that determines spark timing in real-time to meet desired torque requests. The system implements a control algorithm that determines spark timing at designated engine events to meet a desired net torque based on real-time measurements of valve timing, manifold pressures, etc. In a representative configuration, maximum brake torque (MBT) combustion timing of a DBDC+EC engine is determined based on trade-offs between: (1) decreases in heat transfer as combustion retards for power-cylinder only operation; (2) decreases in work from combustion as combustion retards from top dead center (TDC) for power-cylinder only operation; and (3) recovery of additional work as combustion retards for expander-cylinder activated operation. When balancing these considerations, the system is operable to automatically determine MBT combustion timing and adjust spark timing with reduced calibration effort.

Attendant benefits for at least some of the disclosed concepts may include combustion timing and torque control systems offering improved work output and reduced combustion heat transfer for DBDC+EC engine assemblies. Other attendant benefits may include model-based combustion timing that helps to improve the functioning of the vehicle by controlling real-time torque output of the engine with minimal calibration required. Disclosed engine control systems offer the ability to optimize combustion efficiency while concomitantly providing fast torque response tracking and minimizing fuel consumption.

Aspects of this disclosure are directed to model-based torque control logic embodied as processor-executable instructions for governing spark timing of internal combustion engine assemblies. For instance, a method is presented for controlling torque output of an engine assembly. The representative method includes, in any order and in any combination with any of the disclosed features and options: receiving, via a resident or remote programmable engine control unit (ECU), one or more electronic input signals indicative of a requested torque demand (e.g., throttle position) for the engine assembly; determining, via the ECU, a current fuel command (e.g., fuel pulse width) and/or a current valve timing (e.g., variable valve timing actuator feedback) for one or more or all power cylinders of the engine; determining, from a first math model, a desired CA50 (the crank angle where 50 percent of a mass of injected fuel is combusted within the power cylinder(s)) based on the requested torque demand, a power cylinder indicated mean effective pressure (IMEP), an expander cylinder IMEP of one or more or all expander cylinders of the engine, and the current fuel command and/or current valve timing; determining, from a second math model, an MBT CA50 based on the power cylinder IMEP, the expander cylinder IMEP, and the current fuel command/ valve timing; determining, via the ECU, a final spark timing based on a correlation between the desired CA50 and the MBT CA50, e.g., as modified by a spark timing gain and a nominal spark calibration value; and, modulating the torque output of the engine assembly by controlling activation of the electronic igniter by the ECU based on the determined final spark timing.

Other aspects of the present disclosure are directed to motor vehicles equipped with a direct-injection, spark-ignited engine assembly with model-based combustion timing capabilities. As used herein, the term "motor vehicle" may include any relevant vehicle platform, such as passenger vehicles (combustion engine, hybrid electric, fully or partially autonomous, etc.), commercial vehicles, industrial vehicles, tracked vehicles, off-road and all-terrain vehicles (ATV), farm equipment, boats, airplanes, etc. A motor vehicle is presented that includes a vehicle body with an engine compartment, multiple road wheels rotatably attached to the vehicle body, and an internal combustion engine assembly mounted inside the engine compartment and drivingly connected to one or more of the road wheels. The engine assembly includes an engine block fabricated with one or more power cylinders of a first size, and one or more expander cylinders of a second size, greater than the first size. The power and expander cylinders are selectively fluidly coupled, e.g., via a cylinder head and valves. A piston is reciprocally movable in each of the power and expander cylinders. The engine includes electronic igniters that are selectively actuable to ignite a fuel cylinder charge injected into each power cylinder.

Continuing with the above example, the vehicle is equipped with an in-vehicle ECU that is communicatively connected to the engine assembly. The vehicle's ECU is programmed to execute memory stored instructions to receive one or more input signals indicative of a requested torque demand for the engine assembly, and determine a current fuel command and current valve timing for the power cylinder(s). The ECU is also programmed to determine, from a first math model, a desired CA50 based on the requested torque demand, a power cylinder IMEP, an expander cylinder IMEP, the current fuel command, and the current valve timing. The ECU also determines, from a second math model, an MBT CA50 based on the power cylinder IMEP, the expander cylinder IMEP, and the current fuel command and current valve timing. A final spark timing is then determined based on a CA50-spark correlation, which includes a correlation between the desired CA50 and MBT CA50. The torque output of the engine assembly is modulated by controlling activation of the electronic igniter(s) by the ECU based on the determined final spark timing.

Additional aspects of this disclosure are directed to DBDC+EC engine assemblies with model-based torque control capabilities. There is presented, for example, an engine assembly with an engine block fabricated with a power cylinder of a first size and an expander cylinder of a second size greater than the first size. A cylinder head is mounted on the engine block, fluidly coupling the expander cylinder to the power cylinder. A piston is reciprocally movable in each of the cylinders. An intake valve, which is movably mounted to the cylinder head, is selectively actuable to inject a cylinder charge into the power cylinder. An exhaust valve, which is also movably mounted to the cylinder head, is selectively actuable to fluidly couple the power cylinder to the expander cylinder, e.g., to exchange exhaust gases. An electronic igniter is selectively actuable to ignite the cylinder charge injected into the power cylinder.

An ECU is communicatively connected to the engine assembly, and programmed to execute memory stored instructions to receive an input signal indicative of a requested torque demand for the engine assembly, and determine a current fuel command and/or a current valve timing for the power cylinder. The ECU is also programmed to determine, from a first math model, a desired CA50 based on the requested torque demand, a power cylinder IMEP, an expander cylinder IMEP, and the current fuel command/ valve timing. The ECU is further programmed to determine, from a second math model, an MBT CA50 based on the power cylinder IMEP, the expander cylinder IMEP, and the current fuel command/valve timing. The ECU determines a final spark timing based on a CA50-spark correlation, which includes a correlation between the desired CA50 and MBT CA50. A torque output of the engine assembly is then modulated by controlling activation of the electronic igniter by the ECU based on the determined final spark timing.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, this disclosure expressly includes any and all combinations and subcombinations of the elements and features presented above and below.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are provided as an exemplification of the disclosed principles, not limitations of the broad aspects of the disclosure. To that extent, elements and limitations that are described, for example, in the Abstract, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, etc., may be with respect to a motor vehicle, such as a forward driving direction of a motor vehicle when the vehicle is operatively oriented on a normal driving surface, for example.

Figure 1:
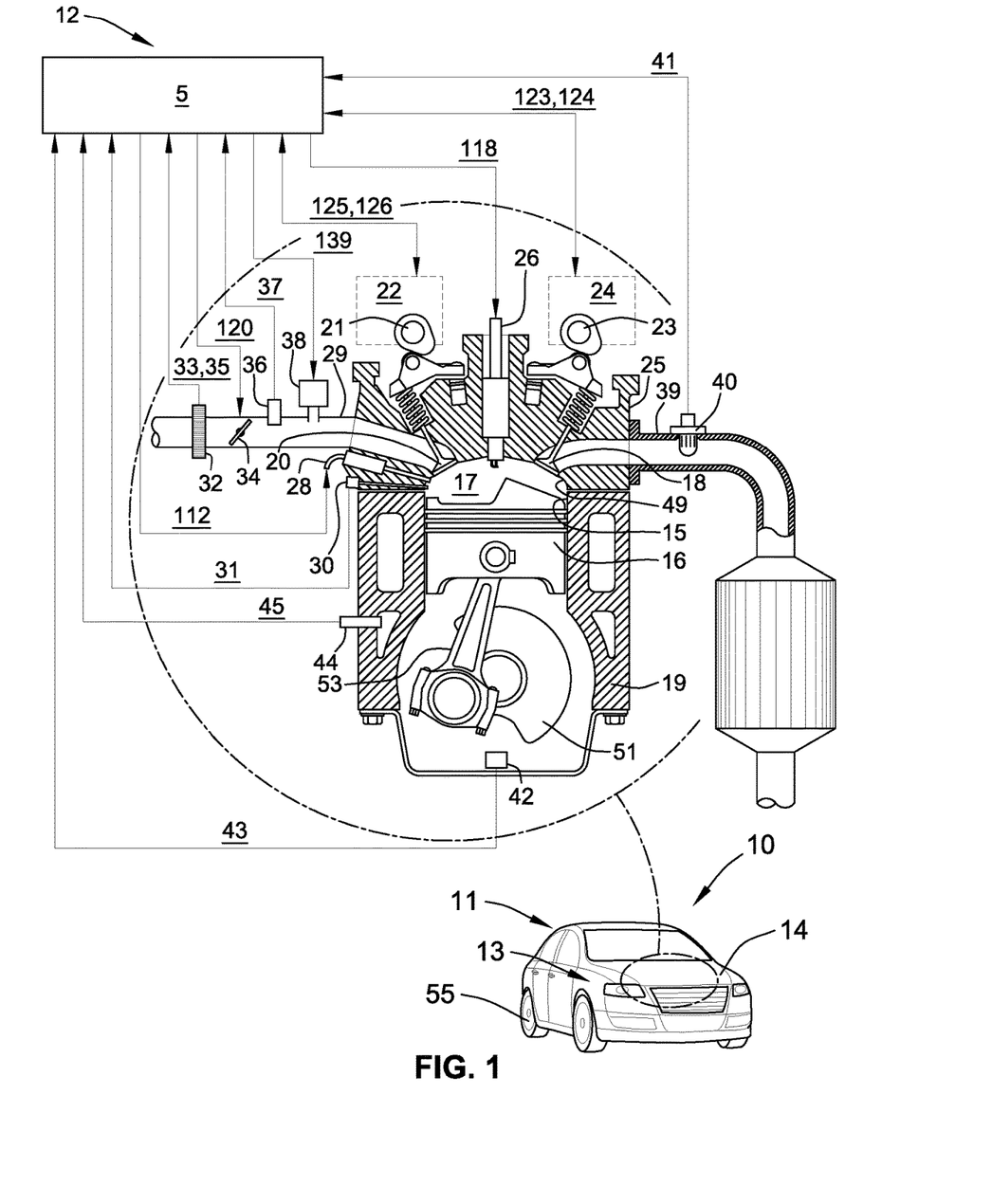
FIG. 1 is a front perspective-view illustration of a representative motor vehicle with an inset schematic illustration of a representative spark-ignited reciprocating-piston type internal combustion engine (ICE) assembly with model-based torque control capabilities in accordance with aspects of the present disclosure.

Referring now to the drawings, wherein like reference numbers refer to like features throughout the several views, there is shown in FIG. 1 a perspective-view illustration of a representative automobile, which is designated generally at 10 and portrayed herein for purposes of discussion as a four-door sedan-style passenger vehicle. Mounted to a vehicle body 11 of the automobile 10, e.g., aft of a front bumper fascia and forward of a passenger compartment, is an internal combustion engine (ICE) assembly 12 housed within an engine compartment 13 covered by an engine hood 14. The illustrated automobile 10—also referred to herein as "motor vehicle" or "vehicle" for short—is merely an exemplary application with which aspects and features of this disclosure may be practiced. In the same vein, implementation of the present concepts into a spark ignited direct injection (SIDI) engine configuration should also be appreciated as an exemplary application of the novel concepts disclosed herein. As such, it will be understood that aspects and features of the present disclosure may be applied to other engine architectures and utilized for any logically relevant type of motor vehicle. Lastly, the drawings presented herein are not necessarily to scale and are provided purely for instructional purposes. Thus, the specific and relative dimensions shown in the drawings are not to be construed as limiting.

There is shown in FIG. 1 an example of a multi-cylinder, dual overhead cam (DOHC), inline-type ICE assembly 12. The illustrated ICE assembly 12 is a four-stroke reciprocating-piston engine configuration that operates to propel the vehicle 10, for example, as a direct injection gasoline engine, including flexible-fuel vehicle (FFV) and hybrid vehicle variations thereof. The ICE assembly 12 can optionally operate in any of an assortment of selectable combustion modes, including homogeneous-charge compression-ignition (HCCI) combustion modes. Additionally, the ICE assembly 12 can operate at a stoichiometric air/fuel ratio and/or at an air/fuel ratio that is primarily lean of stoichiometry. This ICE assembly 12 includes a series of reciprocating pistons 16 slidably movable in cylinder bores 15 of an engine block 19. The top surface or "crown" of each piston 16 cooperates with the inner periphery of its corresponding cylinder 15 and a chamber surface 49 of a cylinder head 25 to define a variable volume combustion chamber 17. Each piston 16 is coupled by a respective connecting rod 53 to a rotating crankshaft 51, by which linear reciprocating motion of the pistons 16 is output as rotational motion to a power transmission (not shown) to drive one or more of the automobiles' road wheels 55.

An air intake system transmits intake air to the cylinders 15 through an intake manifold 29, which directs and distributes air into the combustion chambers 17 via intake runners of the cylinder head 25. The engine's air intake system has airflow ductwork and various electronic devices for monitoring and controlling the air flow. The air intake devices can include, as a non-limiting example, a mass airflow sensor 32 for monitoring mass airflow (MAF) 33 and intake air temperature (IAT) 35. A throttle valve 34 controls airflow to the ICE assembly 12 in response to a control signal (ETC) 120 from a programmable engine control unit (ECU) 5. A pressure sensor 36 in the intake manifold 29 monitors, for instance, manifold absolute pressure (MAP) 37 and barometric pressure. An external flow passage recirculates exhaust gases from engine exhaust to the intake manifold 29, having a control valve in the nature of an exhaust gas recirculation (EGR) valve 38. The programmable engine control unit 5 controls mass flow of exhaust gas to the intake manifold 29 by controlling opening of the EGR valve 38 via EGR command 139. In FIG. 1, the arrows connecting ECU 5 with the various components of the ICE assembly 12 are emblematic of electronic signals or other communication exchanges by which data and/or control commands are transmitted from one component to the other.

Airflow from the intake manifold 29 into the combustion chamber 17 is controlled by one or more intake engine valves 20. Evacuation of exhaust gases out of the combustion chamber 17 to an exhaust manifold 39 is controlled by one or more exhaust engine valves 18. These engine valves 18, 20 are portrayed as spring-biased poppet valves; however, other available types of engine valves may be employed. The ICE assembly 12 valve train system is equipped to control and adjust the opening and closing of the intake and exhaust valves 20, 18. According to one example, the activation of the intake and exhaust valves 20 and 18 may be respectively modulated by controlling intake and exhaust variable cam phasing/variable lift control (VCP/VLC) devices 22 and 24. These two VCP/VLC devices 22, 24 are configured to control and operate an intake camshaft 21 and an exhaust camshaft 23, respectively. Rotation of the intake and exhaust camshafts 21, 23 may be linked to and indexed to rotation of the crankshaft 51, thus linking opening and closing of the intake and exhaust valves 20, 18 to respective positions of the crankshaft 51 and the pistons 16. The intake VCP/VLC device 22 may be fabricated with a mechanism operative to switch and control valve lift of the intake valve(s) 20 in response to a control signal (iVLC) 125, and variably adjust and control phasing of the intake camshaft 21 for each cylinder 15 in response to a control signal (iVCP) 126. In the same vein, the exhaust VCP/VLC device 24 may include a mechanism operative to variably switch and control valve lift of the exhaust valve(s) 18 in response to a control signal (eVLC) 123, and variably adjust and control phasing of the exhaust camshaft 23 for each cylinder 15 in response to a control signal (eVCP) 124. The VCP/VLC devices 22 and 24 may be actuated using any of electro-hydraulic, hydraulic, electro-mechanic, and electric control force, in response to the respective control signals eVLC 123, eVCP 124, iVLC 125, and iVCP 126.

With continuing reference to the representative configuration of FIG. 1, ICE assembly 12 employs a direct-injection fuel injection subsystem with multiple high-pressure fuel injectors 28 that directly inject pulses of fuel into the combustion chambers 17. Each cylinder 15 is provided with one or more fuel injectors 28, which activate in response to an injector pulse width command (INJ_PW) 112 from the ECU 5. These fuel injectors 28 are supplied with pressurized fuel by a fuel distribution system (not shown). One or more or all of the fuel injectors 28 can be operable, when activated, to inject multiple fuel pulses (e.g., a succession of first, second, third, etc., injections of fuel mass) per working cycle into a corresponding one of the ICE assembly cylinders 15. The ICE assembly 12 employs a spark-ignition subsystem by which fuel-combustion-initiating energy—typically in the nature of an abrupt electrical discharge—is provided via a spark plug 26 or other electronic igniter for igniting, or assisting in igniting, cylinder charges in each of the combustion chambers 17 in response to a spark command (IGN) 118 received from the ECU 5.

The ICE assembly 12 is equipped with various sensing devices for monitoring engine operation, including a crank sensor 42 having an output indicative of crankshaft rotational position, e.g., crank angle and/or speed (RPM) signal 43. A temperature sensor 44 is configured to monitor, for example, one or more engine-related (e.g., coolant, fuel, etc.) temperatures, and output a signal 45 indicative thereof. An in-cylinder sensor 30 is configured to monitor one or more combustion-related variables, such as in-cylinder combustion pressure, and output a signal 31 indicative thereof. This sensor signal may be used to determine other operating conditions such as, for example, charge temperature, fuel mass, air-to-fuel ratio, etc. An exhaust gas sensor 40 is configured to monitor exhaust-gas related variables, e.g., actual air/fuel ratio (AFR), burned gas fraction, etc., and output a signal 41 indicative thereof. The combustion pressure and the crankshaft speed can be monitored by the ECU 5, for example, to determine combustion timing, i.e., timing of combustion pressure relative to the crank angle of the crankshaft 51 for each cylinder 15 for each working combustion cycle. It should be appreciated that combustion timing may be determined by other methods. Combustion pressure may be monitored by the ECU 5 to determine an indicated mean effective pressure (IMEP) for each cylinder 15 for each working combustion cycle. The ICE assembly 12 and ECU 5 cooperatively monitor and determine states of IMEP for each of the engine cylinders 15 during each cylinder firing event. Optionally, other sensing devices and systems may be used to monitor states of any combination of desired combustion-related parameters within the scope of the disclosure, e.g., ion-sense ignition systems, EGR fractions, and non-intrusive cylinder pressure sensors.

As indicated above, engine control unit 5 is constructed and programmed to govern, among other things, operation of the engine assembly 12. Control module, module, controller, control unit, electronic control unit, processor, and any permutations thereof may be defined to mean any one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.), whether resident, remote, or a combination of both, executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms, and similar terms may be defined to mean any controller-executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed in real-time, continuously, systematically, sporadically, and/or at regular intervals, for example, each 100 microseconds, 3.125, 6.25, 12.5, 25, and 100 milliseconds, etc., during ongoing vehicle use or operation. Alternatively, routines may be executed in response to occurrence of an event during operation of the engine 12.

Figure 2:
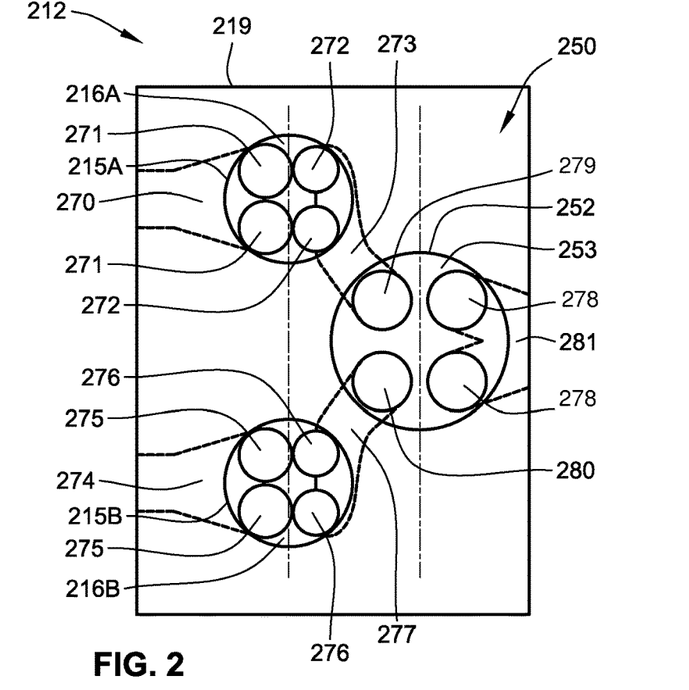
FIG. 2 is a schematic plan-view illustration of a portion of a representative dual-expansion ICE assembly in accordance with aspects of the present disclosure.
Figure 2A:
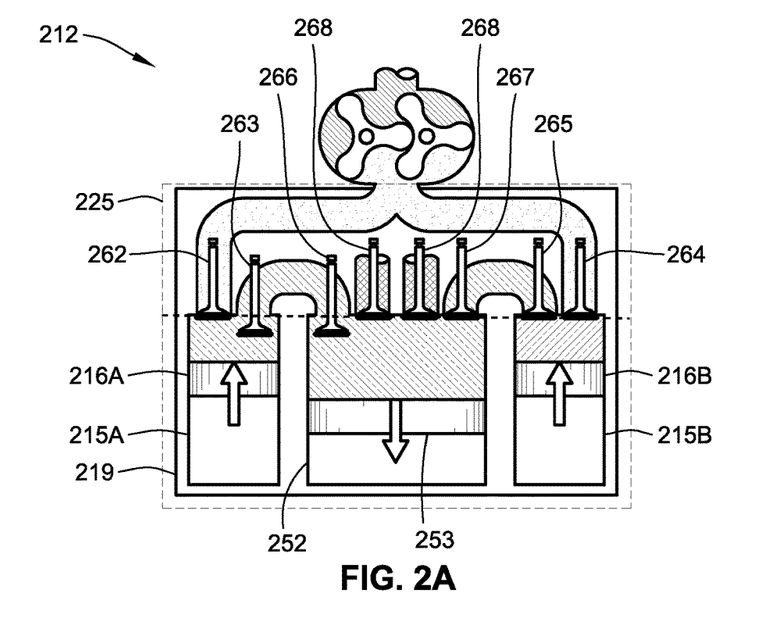
FIG. 2A is a schematic side-view illustration of the representative dual-expansion ICE assembly of FIG. 2.

FIGS. 2 and 2A illustrate an example of a single-shaft, dual-expansion reciprocating-piston type internal combustion engine assembly 212 that provides, for instance, improved thermodynamic efficiency, improved power/weight ratio and reduced emissions over comparable single-expansion, single-compression engine configurations. While differing in appearance, it is envisioned that any of the features disclosed with reference to the engine architecture of FIG. 1 can be incorporated, singly or in any combination, into the example architecture of FIG. 2, and vice versa. As shown, engine assembly 212 includes a cylinder head 225 that is mounted (e.g., via cylinder head gasket and bolts) to the top of an engine block 219, which is fabricated with a compound cylinder configuration generally composed of one or more cylinder triplets 250. Each cylinder triplet 250 may be typified by a pair of power cylinders 215A and 215B, both of which are selectively fluidly coupled to an expander cylinder 252. Although only one cylinder triplet 250 comprising three cylinders is presented, the engine block 219 may define a plurality of cylinder triplets 250 each composed of any logically suitable number of cylinders.

Referencing both FIGS. 2 and 2A, the first power cylinder 215A houses a first power piston 216A that drivingly couples, e.g., via a first crankpin and connecting rod, to an engine crankshaft (e.g., crankshaft 51 of FIG. 1) to translate up and down (in FIG. 2A) along a respective centerline within the cylinder 215A in conjunction with rotation of the crankshaft. Similarly, the second power cylinder 215B houses a second power piston 216B that drivingly couples, e.g., via a second crankpin and connecting rod, to the engine's crankshaft to translate up and down (in FIG. 2A) along a respective centerline within the cylinder 215B in conjunction with rotation of the crankshaft. For at least some embodiments, the first and second power cylinders 215A, 215B, first and second power pistons 216A, 216B, and other attendant components are dimensionally equivalent. In this regard, the first and second crankpins may be radially coincident and rotatably coupled to the crankshaft at the same rotational crank angle. As another option, the power cylinder center lines of the first and second power cylinders 215A, 215B may intersect with the crankshaft's center line; alternatively, the power cylinder center lines may be eccentric to the crankshaft center line.

Expander cylinder 252 is positioned adjacent to the first and second power cylinders 215A, 215B, e.g., within the same cylinder bank, and has a center line that is generally parallel to the center lines of the power cylinders 215A, 215B yet transversely offset from the crankshaft's center line with respect to the engine block 219. An expander piston 253 is housed inside the expander cylinder 252, reciprocally moveable therein to translate up and down (in FIG. 2A) along the aforementioned expander cylinder center line. This expander piston 253 drivingly couples, e.g., via a multi-link connecting rod assembly, to the engine's crankshaft. As can be readily seen from the appended drawings, the expander cylinder 252 is larger in diameter and, thus, in volume than the individual power cylinders 215A, 215B. It may be desirable, for at least some vehicle platforms, that the expander cylinder 252 be between about 1.5 to 4.0 times the volume of a single power cylinder 215A, 215B. In the same vein, expander piston 253 is larger in diameter than the individual power pistons 216A, 216B. Cylinder displacement for the expander cylinder 252, as defined by piston movement between a TDC location and a BDC location of the cylinder, may be application-specific and determined as described herein.

Cylinder head 225 may be fabricated as an integrated device, including cast portions, machined portions, and assembled portions, for controlling and directing flows of intake air, fuel, and combustion gases into and out of the power cylinders 215A, 215B and expander cylinders 252 to effect engine 212 operation and generate mechanical power. The cylinder head 225, which may partially or wholly formed as an integral structure with the engine block 219, is fabricated with structural bearing supports for power camshaft(s) and expander camshaft(s) (e.g., individual sets of intake and exhaust camshafts 21, 23 of FIG. 1) that are rotatably coupled and indexed to the crankshaft. The cylinder head 225 includes first and second power cylinder intake runners 270, 274, respectively, which fluidly connect to first and second power cylinder intake ports 271, 275, respectively, with engine intake airflow controlled by first and second power cylinder intake valves 262, 264, respectively. Cylinder head 225 of FIGS. 2 and 2A is also fabricated with first and second power cylinder exhaust ports 272, 276 (FIG. 2), with exhaust airflow therethrough controlled by first and second power cylinder exhaust valves 263, 265 (FIG. 2A), respectively. While illustrated with two intake valves/ports and two exhaust valves/ports per cylinder, any suitable quantity of intake valves, exhaust valves, intake ports, valves ports, etc., per cylinder, may be employed. The first and second power cylinder intake valves 262, 264 and exhaust valves 263, 265 are shown as normally-closed, spring-biased poppet valves that are activated by rotation of power camshaft(s); alternatively, any other suitable flow-control configuration may be employed.

A first expander cylinder intake runner 273 fluidly couples the first power cylinder exhaust ports 272 to a first expander cylinder intake port 279, with flow controlled by a first expander cylinder intake valve 266 and the first power cylinder exhaust valve 263. Likewise, a second expander cylinder intake runner 277 fluidly couples the second power cylinder exhaust port 276 to a second expander cylinder intake port 280, with flow controlled by a second expander cylinder intake valve 267 and the second power cylinder exhaust valve 265. The cylinder head 225 is fabricated with expander cylinder exhaust port(s) 278, two of which are shown, with corresponding expander cylinder exhaust valve(s) 268 that selectively fluidly connect to an expander cylinder exhaust runner 281 that leads to an exhaust system, which may include exhaust purification devices, a turbocharger, exhaust sound tuning devices, etc. In accord with the representative configuration of FIGS. 2 and 2A, the expander cylinder intake valves 266, 267 and the expander cylinder exhaust valve(s) 268 may be normally-closed, spring-biased poppet valves that are activated by rotation of an expander camshaft. Rotation of the power and expander camshafts may be indexed and linked to rotation of the engine crankshaft.

Normal operation of the single-shaft, dual-expansion reciprocating-piston type internal combustion engine assembly 212 may comprise each power cylinder 215A, 215B executing four strokes—intake, compression, power, exhaust—per single working cycle, while the expander cylinder 252 executes four strokes—intake, exhaust, intake, exhaust—per same working cycle. By way of example, and not limitation, the engine assembly 212 completes the following stages for each working cycle:

1. an intake/expansion stage, which includes the first power cylinder 215A executing an intake stroke, while the second power cylinder 215B executes a power/expansion stroke and the expander cylinder 252 executes an exhaust stroke;
2. a compression/exhaust stage, which includes the first power cylinder 215A executing a compression stroke, while the second power cylinder 215B executes an exhaust stroke and the expander cylinder 252 executes an expansion stroke receiving input exhaust flow from the second power cylinder 215B;
3. an expansion/intake stage, which includes the first power cylinder 215A executing a power/expansion stroke, while the second power cylinder 215B executes an intake stroke and expander cylinder 252 executes an exhaust stroke; and
4. an exhaust/compression stage, shown in FIG. 2A, which includes the first power cylinder 215A executing an exhaust stroke, while the second power cylinder 215B executes a compression stroke and the expander cylinder 252 executes an expansion stroke drawing in exhaust flow from the first power cylinder 215A.

Overall, the power cylinders 215A, 215B may operate in a four-stroke cycle with repetitively executed intake-compression-expansion-exhaust strokes over 720° of crankshaft rotation, with the cycle of the second power cylinder 215B out of phase from the cycle associated of the first power cylinders 215A by 360° of crankshaft rotation. Comparatively, the expander cylinder 252 operates in a two-stroke cycle with repetitively executed intake and exhaust strokes, wherein the intake stroke is alternately coordinated with the exhaust strokes from the first and second power cylinders 215A, 215B.

Figure 3:
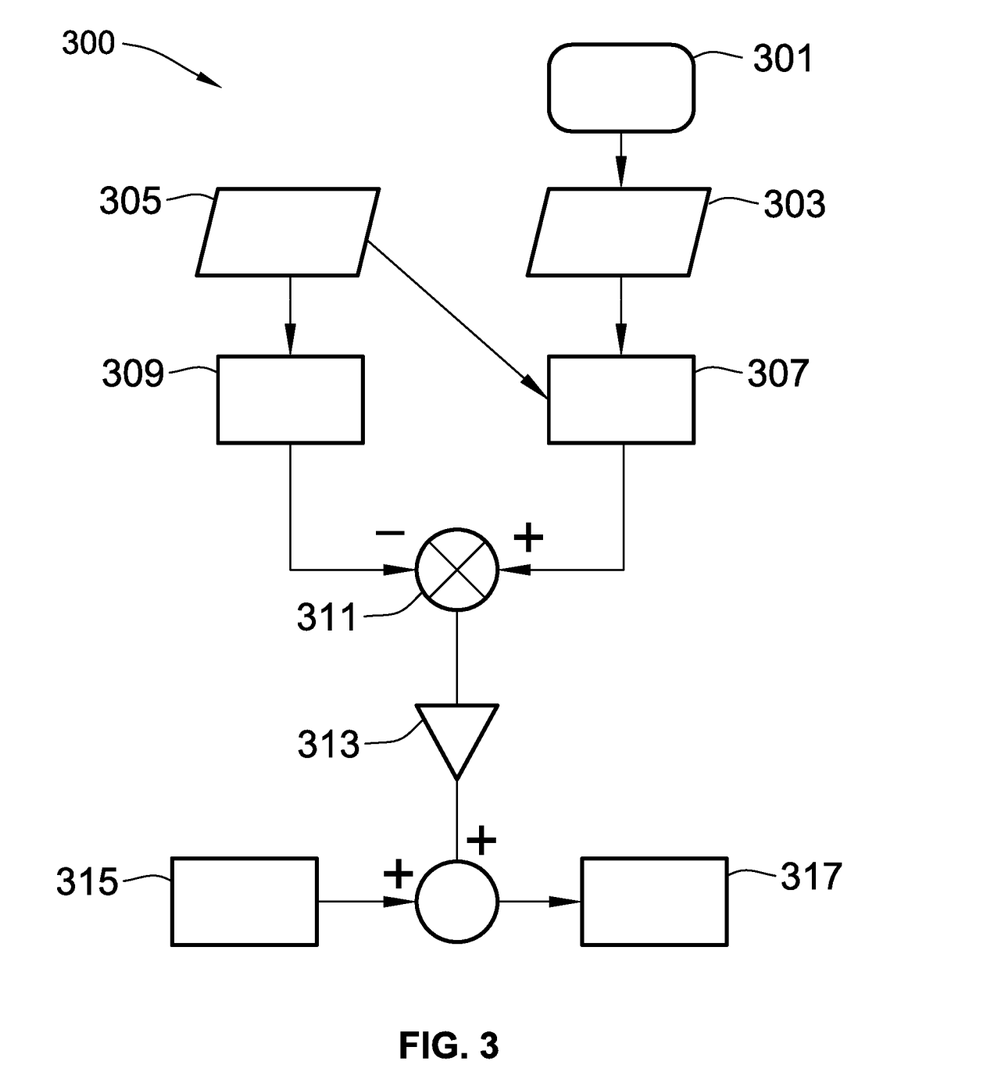
FIG. 3 is a flowchart of a representative algorithm or method for model-based torque control of a spark-ignited, reciprocating-piston internal combustion engine assembly that may correspond to instructions executed by onboard control-logic circuitry, programmable electronic control unit, or other computer-based device of a motor vehicle in accord with aspects of the disclosed concepts.

With reference now to the flow chart of FIG. 3, an improved method or control strategy for governing torque output of a spark-ignited, reciprocating-piston internal combustion engine, such as engine assembly 212 of FIG. 2, for a motor vehicle, such as automobile 10 of FIG. 1, for example, is generally described at 300 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or remote ECU, central processing unit (CPU), vehicle control logic circuit, or other module or device, to perform any or all of the above or below described functions associated with the disclosed concepts. It should also be recognized that the order of execution of the illustrated operation blocks may be changed, additional blocks may be added, and/or some of the blocks described may be modified, combined, or eliminated.

Method 300 begins at terminal block 301 with the vehicle 10 calling up an initialization procedure for a protocol to determine, in real-time, power cylinder spark timing to meet desired net torque of an engine assembly using model-based techniques. In general, the method 300 may be initiated continuously, systematically, arbitrarily, and/or responsively, e.g., upon initiation of a transient vehicle operation, such as a sizeable acceleration or deceleration, or other designated vehicle maneuver. Upon initialization, input/output block 303 may comprise processor-executable instructions for the vehicle ECU 5 of FIG. 1 to receive, from one or more vehicle systems, subsystems, and/or components, one or more input signals indicative of a requested torque demand for the engine assembly 12. A torque demand signal may be generated in response to an operator input or an auto start condition monitored by the ECU 5. For instance, the ECU 5 may be configured to receive a driver input in the form of an electronic signal, such as through physical operation by the driver of an accelerator pedal and/or a brake pedal, and to determine from that signal a corresponding torque request.

Prior to, contemporaneous with, or after executing the operation or operations associated with input/output block 303, method 300 of FIG. 3 continues to input/output block 305 with receiving, retrieving, or otherwise determining a current fuel command and/or a current valve timing for the power cylinder(s) of the engine assembly. As an example, current fuel command may correspond to a desired fuel mass that is based, at least partially, on the torque request, an intake manifold pressure, an exhaust manifold pressure, and/or a calibrated pressure-volume (CPV) map of at least one power cylinder. Correspondingly, a current fuel command may be ascertained by accessing a look-up table to identify a calibrated fuel mass value that corresponds to the torque request under current engine operating conditions. In another non-limiting example, current fuel command may be derived from a fueling pulse width and frequency stored as calibrated default values in memory. As per valve timing, each power cylinder may define multiple cylinder volumes (V), including: a first cylinder volume ($V_{EVC}$) when an exhaust valve is closing; a second cylinder volume ($V_{EVO}$) when an exhaust valve is opening; a third cylinder volume ($V_{IVO}$) when an intake valve is opening; and a fourth cylinder volume ($V_{IVC}$) when an intake valve is closing. For engine assemblies equipped with multiple intake valves and multiple exhaust valves, valve timing may be defined as the ECU-governed timing when the intake valves are opened, when the exhaust valves are opened, and/or when all exhaust and intake valves are closed.

Method 300 then proceeds to process block 307 and calculates, retrieves or otherwise determines a desired CA50 from a first math model based on the requested torque demand, a power cylinder IMEP, an expander cylinder IMEP, the current fuel command, and/or the current valve timing. The term "CA50", as used herein, may be defined as a crank angle position of a power piston where 50% of a mass of injected fuel is combusted within the power cylinder. Put another way, a CA50 crank angle may be defined as a crank angle position where 50% of total heat is generated in a given cycle by a power cylinder. In accordance with the disclosed concepts, the first math model may be an inverse CA50 end of combustion (EOC) torque control model in which:

$$IMEP + IMEP_{EC} \propto Q_{LHV} m_f \times k(EOC) \times$$

$$\left\{ 1 - \left(\frac{V_{EVO}^{ENG}}{V_{EOC}^{ENG}}\right)^{1-\gamma} + \left(\frac{V_{EVO}^{ENG+EC}}{V_{EOC}^{ENG}}\right)^{1-\gamma} - \left(\frac{V_{EVO\_EC}^{ENG+EC}}{V_{EOC}^{ENG}}\right)^{1-\gamma} \right\} =$$

$$Q_{LHV} m_f (k_1 EOC + k_2 - (V_{EVO}^{ENG1-\gamma} - V_{EVO}^{ENG+EC1-\gamma} + V_{EVO\_EC}^{ENG+EC1-\gamma}) \times$$

$$(k_1 EOC + k_2) \times V_{EOC}^{ENG\gamma-1}) \approx$$

$$Q_{LHV} m_f (k_1 EOC + k_2 - (V_{EVO}^{ENG1-\gamma} - V_{EVO}^{ENG+EC1-\gamma} + V_{EVO\_EC}^{ENG+EC1-\gamma}) \times$$

$$(aEOC^2 + bEOC + c)) =$$

$$Q_{LHV} m_f (-afEOC^2 + (k_1 - bf)EOC + k_2 - cf)$$

where $$f = V_{EVO}^{ENG1-\gamma} - V_{EVO}^{ENG+EC1-\gamma} + V_{EVO\_EC}^{ENG+EC1-\gamma}$$

and where IMEP is the power cylinder IMEP, $IMEP_{EC}$ is the expander cylinder IMEP; $Q_{LHV}$ is a low heating value constant for the fuel; $m_f$ is a desired fuel mass; $k(EOC)$ is a calibrated constant coefficient for end of combustion (e.g., $k(EOC)=k1*EOC+k2$); $V^{ENG+EC}_{EVO}$ is a total volume of a power cylinder and an expander cylinder at exhaust valve opening; $V^{ENG}_{EVO}$ is a volume of a power cylinder at exhaust valve opening; $V^{ENG}_{EOC}$ is a volume of a power cylinder at end of combustion; $V^{ENG+EC}_{EVO\_EC}$ is a total volume of a power cylinder and an expander cylinder at expander exhaust valve opening; and γ is a heat capacity ratio constant. In this instance, $IMEP_{EC}$ may be determined as:

$$IMEP_{EC} = \frac{1}{V_d}$$

$$\int_{V_{EVO}^{ENG+EC}}^{V_{EVO\_EC}^{ENG+EC}} \left( \left( p_{EOC} \left(\frac{V_{EOC}}{V_{EVO}}\right)^\gamma \left(\frac{V_{EVO}}{V_{EVO}^{ENG+EG}}\right)^\gamma + p_e \left(\frac{V_{EVC\_EC}^{EC}}{V_{EVO}^{EC}}\right)^\gamma \left(\frac{V_{EVO}^{EC}}{V_{EVO}^{ENG+EC}}\right)^\gamma \right) \right.$$

$$\left. \left(\frac{V_{EVO}^{ENG+EC}}{V^{ENG+EC}}\right)^\gamma - p_e \right) dV^{ENG+EC}$$

where $V_d$ is a displacement of a power cylinder; $V_{EVO}$ is a volume at exhaust valve opening; $V_{EOC}$ is a volume at end of combustion; $P_{EOC}$ is a pressure at end of combustion; $V^{EC}_{EVC\_EC}$ is a total volume of an expander cylinder at expander exhaust valve closing; $V^{ENG+EC}$ is a total volume of a power cylinder and an expander cylinder; $p_e$ is an exhaust manifold pressure; and $V^{EC}_{EVO}$ is a volume of the expander cylinder at exhaust valve opening. Derivation of work from the expander cylinder(s)—accounting for pressures from both the power cylinder(s) and the expander cylinder(s)—allows $IMEP_{EC}$ to be determined as:

$$IMEP_{EC} = \frac{1}{V_d} \int_{V^{ENG+EC}_{EVO}}^{V^{ENG+EC}_{EVO\_EC}} \left( \left( p_{EOC} \left( \frac{V_{EOC}}{V_{EVO}} \right)^\gamma \left( \frac{V_{EVO}}{V^{ENG+EG}_{EVO}} \right)^\gamma + p_e \left( \frac{V^{EC}_{EVC\_EC}}{V^{EC}_{EVO}} \right)^\gamma \right. \right.$$
$$\left. \left. \left( \frac{V^{EC}_{EVO}}{V^{ENG+EC}_{EVO}} \right)^\gamma \right) \left( \frac{V^{ENG+EC}_{EVO}}{V^{ENG+EC}} \right)^\gamma - p_e \right) dV^{ENG+EC} =$$
$$\frac{1}{V_d} \int_{V^{ENG+EC}_{EVO}}^{V^{ENG+EC}_{EVO\_EC}} \left( p_{EOC} \left( \frac{V_{EOC}}{V^{ENG+EC}} \right)^\gamma + p_e \left( \frac{V^{EC}_{EVC\_EC}}{V^{ENG+EC}} \right)^\gamma - p_e \right) dV^{ENG+EC} \approx$$
$$\frac{1}{V_d} \left\{ \frac{p_{EOC} V_{EOC}^\gamma + p_e V^{EC}{}_{EVC\_EC}^\gamma}{1-\gamma} \left[ (V^{ENG+EC}_{EVO\_EC})^{1-\gamma} - (V^{ENG+EC}_{EVO})^{1-\gamma} \right] - \right.$$
$$\left. p_e (V^{ENG+EC}_{EVO\_EC} - V^{ENG+EC}_{EVO}) \right\} \therefore$$
$$IMEP_{EC} \approx \frac{1}{V_d} \left\{ \left( \frac{p_e}{1-\gamma} V^{EC}{}_{EVC\_EC}^\gamma + \frac{p_i}{1-\gamma} V_{IVC}^\gamma - \right. \right.$$
$$\left. \left. \frac{Q_{LHV} m_f}{V_{EOC}} V_{EOC}^\gamma \right) [(V^{ENG+EC}_{EVO\_EC})^{1-\gamma} - (V^{ENG+EC}_{EVO})^{1-\gamma}] - p_e (V^{ENG+EC}_{EVO\_EC} - V^{ENG+EC}_{EVO}) \right\}$$

where $p_i$ is an intake manifold pressure; and $V_{IVC}$ is a cylinder volume at intake valve closing. When the expander is engaged and working in a nominal operation mode, exhaust gas is pushed from power cylinder into expander cylinder to generate effective work before the exhaust gas is discharged into the exhaust manifold. The term $$p_{EOC} \left( \frac{V_{EOC}}{V_{EVO}} \right)^\gamma \left( \frac{V_{EVO}}{V^{ENG+EC}_{EVO}} \right)^\gamma$$

represents the pressure brought by the exhaust gas coming from the power cylinder(s), while the term $$p_e \left( \frac{V^{EC}_{EVC\_EC}}{V^{EC}_{EVO}} \right)^\gamma \left( \frac{V^{EC}_{EVO}}{V^{ENG+EC}_{EVO}} \right)^\gamma$$

represents the pressure due to the compressed gas in the expander cylinder. Given that pressure changes rapidly once a power cylinder exhaust valve is open, it may be assumed that it is similar to constant volume combustion. With this in mind, the $IMEP_{EC}$ of an expander cylinder can be calculated as indicated above.

At process block 309, the method 300 proceeds to calculate, retrieve or otherwise determine a maximum brake torque (MBT) CA50 from a second math model, which is distinct from the first math model, based on power cylinder IMEP, expander cylinder IMEP, current fuel command, and/or current valve timing. The second math model may be an MBT CA50 EOC model in which:

$$\frac{\partial (IMEP + IMEP_{EC})}{\partial EOC} \propto Q_{LHV} m_f (-2af EOC + k_1 - bf) \Rightarrow$$

-continued
$$\left. \frac{\partial (IMEP + IMEP_{EC})}{\partial EOC} \right|_{EOC_{MBT}} = 0 \Rightarrow \therefore EOC_{MBT} = \frac{k_1 - bf}{2af}$$

where
$$f = V^{ENG^{1-\gamma}}_{EVO} - V^{ENG+EC^{1-\gamma}}_{EVO} + V^{ENG+EC^{1-\gamma}}_{EVO\_EC}$$

and where $k_1$ is a first calibrated constant coefficient; $k_2$ is a second calibrated constant coefficient; a is a third calibrated constant coefficient; b is a fourth calibrated constant coefficient; and c is a fifth calibrated constant coefficient. These calibrated constant coefficients $k_1$, $k_2$, a, b, c may be determined based on one or more current engine operating conditions, including current fuel mass and engine speed, e.g., each retrieved from a corresponding look-up table stored in memory. The look-up table may be a two-dimensional table that includes calibration constant values for given engine speed and mass air bands, with each band ranging between minimum and maximum values. In general, it should be recognized from the models presented above that the later the combustion timing, the higher the exhaust pressure; conversely, the earlier the combustion timing, the lower the exhaust pressure. With these considerations in mind, the ECU 5 utilizes the math models to identify an optimal CA50 that maximizes net work between power cylinder and expander cylinder. MBT combustion timing for engine assemblies employing expander cylinders helps to reduce peak cylinder temperature which, in turn, leads to lower NOx emissions and better fuel economy.

Method 300 may then require determining a CA50-spark correlation between the desired CA50 and the MBT CA50, as indicated at logic junction 311. For at least some implementations, the CA50-spark correlation may consist of an absolute mathematical difference between the desired CA50 and the MBT CA50. From this correlation, the system can determine whether or not to retard/advance spark timing to thereby retard/advance CA50. At merger operation 313, an engine-calibrated spark timing gain h is applied to the CA50-spark correlation prior to determining a final spark timing. If a given torque request differential is relatively large, the change in engine torque for a given change in spark timing (i.e., curve slope) over a normal spark control operating range may be relatively constant. Therefore, a change in spark timing as a function of the difference between desired and actual engine torque may maintain the engine sufficiently well with spark timing invariant gain. As a result, a spark timing gain must be scheduled from a table, with multiple tables used to cover a range of engine speeds encountered during engine operation.

At process block 317, the method 300 requires determining (e.g., via the vehicle ECU 5) a final spark timing based, at least in part, on the CA50-spark correlation, e.g., as modified by the spark timing gain and a nominal spark calibration value. In this regard, process block 315 may comprise processor-executable instructions to receive, retrieve or otherwise determine a nominal spark calibration value. Spark control calibration values may be retrieved from a dedicated engine-calibrated look-up table, e.g., based on one or more current engine operating conditions. Nominal spark calibration values may be obtained through standard combustion calibration processes, e.g., to push combustion timing to MBT CA50 for each point. In this instance, a final spark timing $Spk_{final}$ may be determined at process block 315 as:

$$Spk_{final} = h(CA50_{desired} - CA50_{MBT}) + Spk_{nominal}$$

where h is a spark timing gain; $CA50_{desired}$ is a desired CA50; $CA50_{MBT}$ is an MBT CA50; and $Spk_{nominal}$ is a nominal spark calibration value. Using this final spark timing $Spk_{final}$, the ECU 5 is operable to modulate torque output of the engine assembly 12 by controlling activation of the electronic igniter (e.g., spark plug 26 of FIG. 1). The correlation between spark timing and CA50 may be found, for example, by sweeping a quasi-linear calibrated sparking timing map and measuring the corresponding CA50. Torque may be represented in the math models described above as $(IMEP+IMEP_{EC})$, with $Q_{LHV}$ is a lower heat value of the fuel mass $m_f$ and valve timings lumped into factor f.

Figure 4:
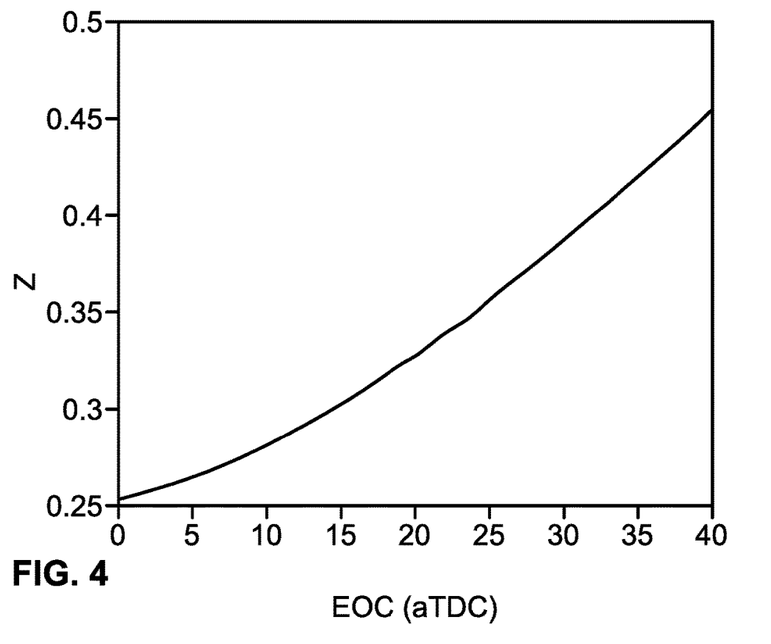
FIG. 4 is a graphical illustration of end of combustion at top dead center versus a calibrated constant coefficient (Z) for model-based torque control in accordance with aspects of the present disclosure.

FIG. 4 is a graphical illustration of end of combustion at top dead center versus a calibrated constant coefficient Z for model-based torque control. In this instance, calibrated constant coefficient Z may be determined as:

$$Z=(k_1 EOC + k_2) \times V_{EOC}^{\gamma-1} \approx a EOC^2 + b EOC + c$$

Figure 5:
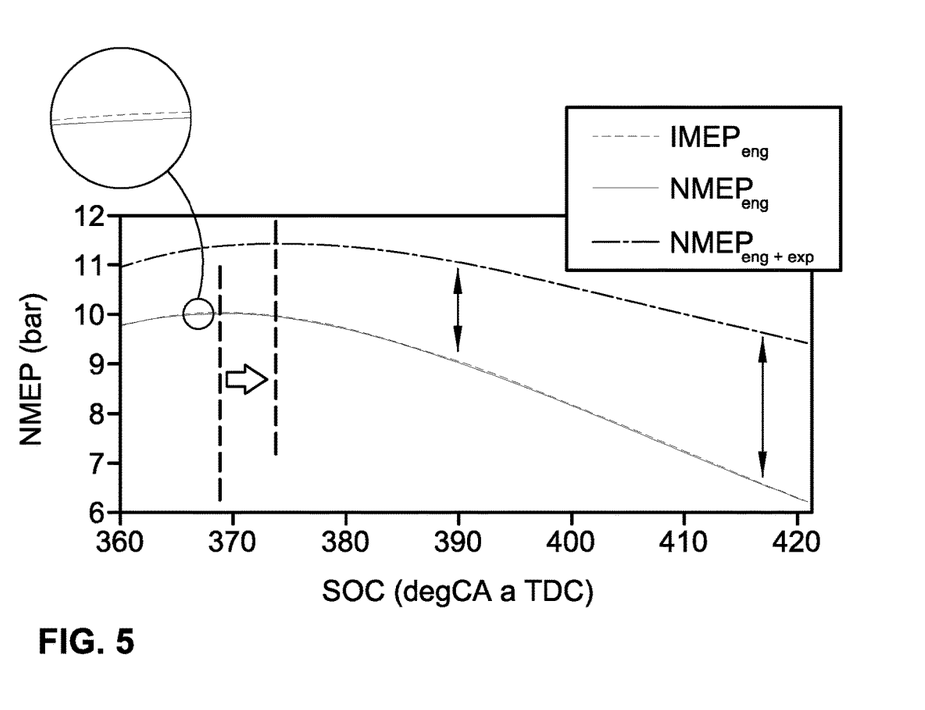
FIG. 5 is a graphical illustration of start of combustion versus net mean effective pressure (NMEP) for a representative MBT EOC model comparing an engine assembly having collaborative expander and power cylinders with an engine assembly having only power cylinders in accordance with aspects of the present disclosure.

The graph of FIG. 4 helps to show how to approximate the calibrated constant coefficient Z (originally a nonlinear function of EOC) as a quadratic form of EOC using an analytic approach. From this correlation, a simplified relationship between $(IMEP+IMEP_{EC})$ and EOC can be found, as indicated above in the final form of the inverse CA50 EOC torque control model. FIG. 5 is a graphical illustration of start of combustion (SOC) at TDC versus net mean effective pressure (NMEP) for a representative MBT EOC model comparing $NMEP_{ENG+EC}$ of a representative engine assembly having collaborative expander and power cylinders with $NMEP_{ENG}$ of a representative engine assembly without expander cylinders. This graph helps to illustrate that now with MBT CA50 for an engine assembly with an expander cylinder differs from the MBT CA50 of an engine assembly without expander cylinders. FIG. 5 also helps to depict the tradeoff between power cylinder and expander cylinder mentioned above.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in other manners (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling torque output of an engine assembly, the engine assembly including an engine block with a power cylinder of a first size selectively fluidly coupled to an expander cylinder of a second size, pistons each reciprocally movable in a respective one of the power and expander cylinders, and an electronic igniter controlled by an engine control unit (ECU) to ignite a cylinder charge in the power cylinder, the method comprising:

receiving, via the ECU, an input signal indicative of a requested torque demand for the engine assembly;

determining, via the ECU, a current fuel command and/or a current valve timing for the power cylinder;

determining, from a first math model, a desired CA50 (a crank angle where 50 percent of a mass of injected fuel is combusted within the power cylinder) based on the requested torque demand, a power cylinder indicated mean effective pressure (IMEP), an expander cylinder IMEP, and the current fuel command and/or the current valve timing;

determining, from a second math model, a maximum brake torque (MBT) CA50 based on the power cylinder IMEP, the expander cylinder IMEP, and the current fuel command and/or the current valve timing;

determining, via the ECU, a final spark timing based on a CA50-spark correlation, the CA50-spark correlation including a correlation between the desired CA50 and the MBT CA50; and modulating a torque output of the engine assembly by controlling activation of the electronic igniter by the ECU based on the determined final spark timing.

2. The method of claim 1, wherein the first math model is an inverse CA50 end of combustion (EOC) model in which:

$$IMEP + IMEP_{EC} \propto Q_{LHV} m_f \times k(EOC) \times$$

$$\left\{ 1 - \left(\frac{V^{ENG}_{EVO}}{V^{ENG}_{EOC}}\right)^{1-\gamma} + \left(\frac{V^{ENG+EC}_{EVO}}{V^{ENG}_{EOC}}\right)^{1-\gamma} - \left(\frac{V^{ENG+EC}_{EVO\_EC}}{V^{ENG}_{EOC}}\right)^{1-\gamma} \right\} =$$

$$Q_{LHV} m_f (-afEOC^2 + (k_1 - bf)EOC + k_2 - cf) \text{ where } f =$$

$$V^{ENG^{1-\gamma}}_{EVO} - V^{ENG+EC^{1-\gamma}}_{EVO} + V^{ENG+EC^{1-\gamma}}_{EVO\_EC}$$

and where IMEP is the power cylinder IMEP, $IMEP_{EC}$ is the expander cylinder IMEP; $Q_{LHV}$ is a low heating value constant; $m_f$ is a desired fuel mass; $k(EOC)$ is a calibrated constant coefficient for end of combustion; $V^{ENG+EC}_{EVO}$ is a total volume of the power cylinder and the expander cylinder at exhaust valve opening; $V^{ENG}_{EVO}$ is a volume of the power cylinder at exhaust valve opening; $V^{ENG}_{EOC}$ is a volume of the power cylinder at end of combustion; $V^{ENG+EC}_{EVO\_EC}$ is a total volume of the power cylinder and the expander cylinder at expander exhaust valve opening; and $\gamma$ is a heat capacity ratio.

3. The method of claim 2, wherein $IMEP_{EC}$ is determined as:

$$IMEP_{EC} = \frac{1}{V_d}$$

$$\int_{V^{ENG+EC}_{EVO}}^{V^{ENG+EC}_{EVO\_EC}} \left( \left( p_{EOC}\left(\frac{V_{EOC}}{V_{EVO}}\right)^\gamma \left(\frac{V_{EVO}}{V^{ENG+EC}_{EVO}}\right)^\gamma + p_e \left(\frac{V^{EC}_{EVC\_EC}}{V^{EC}_{EVO}}\right)^\gamma \left(\frac{V^{EC}_{EVO}}{V^{ENG+EC}_{EVO}}\right)^\gamma \right) \right.$$

$$\left. \left(\frac{V^{ENG+EC}_{EVO}}{V^{ENG+EC}}\right)^\gamma - p_e \right) dV^{ENG+EC}$$

where $V_d$ is a displacement of the power cylinder; $V_{EVO}$ is a volume at exhaust valve opening; $V_{EOC}$ is a volume at end of combustion; $P_{EOC}$ is a pressure at end of combustion; $V^{EC}_{EVC\_EC}$ is a total volume of the expander cylinder at expander exhaust valve closing; $V^{ENG+EC}$ is a total volume of the power cylinder and the expander cylinder; $p_e$ is an exhaust manifold pressure; and $V^{EC}_{EVO}$ is a volume of the expander cylinder at exhaust valve opening.

4. The method of claim 2, wherein $IMEP_{EC}$ is determined as:

$$IMEP_{EC} \approx$$

$$\frac{1}{V_d} \left\{ \left( \frac{p_e}{1-\gamma} V^{EC^\gamma}_{EVC\_EC} + \frac{p_i}{1-\gamma} V^\gamma_{IVC} - \frac{Q_{LHV} m_f}{V_{EOC}} V^\gamma_{EOC} \right) \left[ (V^{ENG+EC}_{EVO\_EC})^{1-\gamma} - (V^{ENG+EC}_{EVO})^{1-\gamma} \right] - p_e (V^{ENG+EC}_{EVO\_EC} - V^{ENG+EC}_{EVO}) \right\}$$

where $p_i$ is an intake manifold pressure; and $V_{IVC}$ is a cylinder volume at intake valve closing.

5. The method of claim 1, wherein the second math model is an MBT CA50 EOC model in which:

$$\frac{\partial (IMEP + IMEP_{EC})}{\partial EOC} \propto Q_{LHV} m_f (-2afEOC + k_1 - bf) \Rightarrow$$

$$\frac{\partial (IMEP + IMEP_{EC})}{\partial EOC}\bigg|_{EOC_{MBT}} = 0 \therefore EOC_{MBT} = \frac{k_1 - bf}{2af}$$

where $k_1$ is a first calibrated constant coefficient; a is a third calibrated constant coefficient; b is a fourth calibrated constant coefficient; and c is a fifth calibrated constant coefficient.

6. The method of claim 1, further comprising applying a spark timing gain to the CA50-spark correlation prior to determining the final spark timing.

7. The method of claim 1, further comprising:
determining a nominal spark calibration value; and
modifying the final spark timing based on the nominal spark calibration value.

8. The method of claim 1, wherein the CA50-spark correlation includes a mathematical difference between the desired CA50 and the MBT CA50.

9. The method of claim 1, wherein the final spark timing $Spk_{final}$ is determined as:

$$Spk_{final} = h(CA50_{desired} - CA50_{MBT}) + Spk_{nominal}$$

where h is a spark timing gain; $CA50_{desired}$ is the desired CA50; $CA50_{MBT}$ is the MBT CA50; and $Spk_{nominal}$ is a nominal spark calibration value.

10. The method of claim 1, wherein the engine assembly further includes an intake valve controlling injection of the cylinder charge into the power cylinder, and an exhaust valve selectively fluidly coupling the power cylinder to the expander cylinder, the method further comprising determining: a first cylinder volume $V_{ENC}$ when the exhaust valve is closed; a second cylinder volume $V_{EVO}$ when the exhaust valve is open; a third cylinder volume $V_{IVO}$ when the intake valve is open; and a fourth cylinder volume $V_{IVC}$ when the intake valve is closed.

11. A motor vehicle comprising:
a vehicle body defining an engine compartment;
a plurality of road wheels rotatably attached to the vehicle body;
an internal combustion engine assembly mounted inside the engine compartment and drivingly connected to one or more of the road wheels, the engine assembly including an engine block defining a power cylinder of a first size, an expander cylinder of a second size, greater than the first size, selectively fluidly coupled to the power cylinder, pistons each reciprocally movable in a respective one of the power and expander cylinders, and an electronic igniter selectively actuable to ignite a cylinder charge in the power cylinder; and
an engine control unit (ECU) communicatively connected to the engine assembly, the ECU being programmed to execute memory stored instructions to:
receive an input signal indicative of a requested torque demand for the engine assembly;
determine a current fuel command and a current valve timing for the power cylinder;
determine, from a first math model, a desired CA50 (a crank angle where 50 percent of a mass of injected fuel is combusted within the power cylinder) based on the requested torque demand, a power cylinder indicated mean effective pressure (IMEP), an expander cylinder IMEP, the current fuel command, and the current valve timing;
determine, from a second math model, a maximum brake torque (MBT) CA50 based on the power cylinder IMEP, the expander cylinder IMEP, the current fuel command, and the current valve timing;
determine a final spark timing based on a CA50-spark correlation, the CA50-spark correlation including a correlation between the desired CA50 and the MBT CA50; and
modulate a torque output of the engine assembly by controlling activation of the electronic igniter by the ECU based on the determined final spark timing.

12. An engine assembly comprising:
an engine block defining a power cylinder of a first size and an expander cylinder of a second size, the second size of the expander cylinder being greater than the first size of the power cylinder;
a cylinder head mounted on the engine block and fluidly coupling the expander cylinder to the power cylinder;
a plurality of pistons each reciprocally movable in a respective one of the power and expander cylinders;
an intake valve movably mounted to the cylinder head and selectively actuable to inject a cylinder charge into the power cylinder;
an exhaust valve movably mounted to the cylinder head and selectively actuable to fluidly couple the power cylinder to the expander cylinder;
an electronic igniter selectively actuable to ignite the cylinder charge injected into the power cylinder; and
an engine control unit (ECU) communicatively connected to the electronic igniter, the ECU being programmed to execute memory stored instructions to:
receive an input signal indicative of a requested torque demand for the engine assembly;
determine a current fuel command and/or a current valve timing for the power cylinder;
determine, from a first math model, a desired CA50 (a crank angle where 50 percent of a mass of injected fuel is combusted within the power cylinder) based on the requested torque demand, a power cylinder indicated mean effective pressure (IMEP), an expander cylinder IMEP, and the current fuel command and/or the current valve timing;
determine, from a second math model, a maximum brake torque (MBT) CA50 based on the power cylinder IMEP, the expander cylinder IMEP, and the current fuel command and/or the current valve timing;
determine a final spark timing based on a CA50-spark correlation, the CA50-spark correlation including a correlation between the desired CA50 and the MBT CA50; and
modulate a torque output of the engine assembly by controlling activation of the electronic igniter by the ECU based on the determined final spark timing.

13. The engine assembly of claim 12, wherein the first math model is an inverse CA50 end of combustion (EOC) model in which:

$$IMEP + IMEP_{EC} \propto Q_{LHV} m_f \times k(EOC) \times$$

$$\left\{ 1 - \left(\frac{V_{EVO}^{ENG}}{V_{EOC}^{ENG}}\right)^{1-\gamma} + \left(\frac{V_{EVO}^{ENG+EC}}{V_{EOC}^{ENG}}\right)^{1-\gamma} - \left(\frac{V_{EVO\_EC}^{ENG+EC}}{V_{EOC}^{ENG}}\right)^{1-\gamma} \right\} =$$

$$Q_{LHV} m_f (-afEOC^2 + (k_1 - bf)EOC + k_2 - cf) \text{ where } f =$$

$$V_{EVO}^{ENG\,1-\gamma} - V_{EVO}^{ENG+EC\,1-\gamma} + V_{EVO\_EC}^{ENG+EC\,1-\gamma}$$

and where IMEP is the power cylinder IMEP, $IMEP_{EC}$ is the expander cylinder IMEP; $Q_{LHV}$ is a low heating value constant; $m_f$ is a desired fuel mass; $k(EOC)$ is a calibrated constant coefficient for end of combustion; $V^{ENG+EC}_{EVO}$ is a total volume of the power cylinder and the expander cylinder at exhaust valve opening; $V^{ENG}_{EVO}$ is a volume of the power cylinder at exhaust valve opening; $V^{ENG}_{EOC}$ is a volume of the power cylinder at end of combustion; $V^{ENG+EC}_{EVO\_EC}$ is a total volume of the power cylinder and the expander cylinder at expander exhaust valve opening; and γ is a heat capacity ratio.

14. The engine assembly of claim 13, wherein $IMEP_{EC}$ is determined as:

$$IMEP_{EC} = \frac{1}{V_d}$$

$$\int_{V_{EVO}^{ENG+EC}}^{V_{EVO\_EC}^{ENG+EC}} \left( \left( p_{EOC} \left(\frac{V_{EOC}}{V_{EVO}}\right)^\gamma \left(\frac{V_{EVO}}{V_{EVO}^{ENG+EC}}\right)^\gamma + p_e \left(\frac{V_{EVC\_EC}^{EC}}{V_{EVO}^{EC}}\right)^\gamma \left(\frac{V_{EVO}^{EC}}{V_{EVO}^{ENG+EC}}\right)^\gamma \right) \right.$$

$$\left. \left(\frac{V_{EVO}^{ENG+EC}}{V^{ENG+EC}}\right)^\gamma - p_e \right) dV^{ENG+EC}$$

where $V_d$ is a displacement of the power cylinder; $V_{EVO}$ is a volume at exhaust valve opening; $V_{EOC}$ is a volume at end of combustion; $P_{EOC}$ is a pressure at end of combustion; $V^{EC}_{EVC\_EC}$ is a total volume of the expander cylinder at expander exhaust valve closing; $V^{ENG+EC}$ is a total volume of the power cylinder and the expander cylinder; $p_e$ is an exhaust manifold pressure; and $V^{EC}_{EVO}$ is a volume of the expander cylinder at exhaust valve opening.

15. The engine assembly of claim 13, wherein $IMEP_{EC}$ is determined as:

$$IMEP_{EC} \approx$$

$$\frac{1}{V_d} \left\{ \left( \frac{p_e}{1-\gamma} V_{EVC\_EC}^{EC}{}^\gamma + \frac{p_i}{1-\gamma} V_{IVC}{}^\gamma - \frac{Q_{LHV} m_f}{V_{EOC}} V_{EOC}{}^\gamma \right) \left[ (V_{EVO\_EC}^{ENG+EC})^{1-\gamma} - \right. \right.$$

$$\left. \left. (V_{EVO}^{ENG+EC})^{1-\gamma} \right] - p_e (V_{EVO\_EC}^{ENG+EC} - V_{EVO}^{ENG+EC}) \right\}$$

where $p_i$ is an intake manifold pressure; and $V_{IVC}$ is a cylinder volume at intake valve closing.

16. The engine assembly of claim 12, wherein the second math model is an MBT CA50 EOC model in which:

$$\frac{\partial(IMEP + IMEP_{EC})}{\partial EOC} \propto Q_{LHV} m_f (-2afEOC + k_1 - bf) \Rightarrow$$

$$\left. \frac{\partial(IMEP + IMEP_{EC})}{\partial EOC} \right|_{EOC_{MBT}} = 0 \Rightarrow \therefore EOC_{MBT} = \frac{k_1 - bf}{2af}$$

where $k_1$ is a first calibrated constant coefficient; $k_2$ is a second calibrated constant coefficient; a is a third calibrated constant coefficient; b is a fourth calibrated constant coefficient; and c is a fifth calibrated constant coefficient.

17. The engine assembly of claim 12, wherein the ECU is further programmed to apply a spark timing gain to the CA50-spark correlation prior to determining the final spark timing.

18. The engine assembly of claim 12, wherein the ECU is further programmed to:
determine a nominal spark calibration value; and
modify the final spark timing based on the nominal spark calibration value.

19. The engine assembly of claim 12, wherein the CA50-spark correlation includes a mathematical difference between the desired CA50 and the MBT CA50.

20. The engine assembly of claim 12, wherein the ECU is further programmed to determine: a first cylinder volume $V_{ENC}$ when the exhaust valve is closed; a second cylinder volume $V_{EVO}$ when the exhaust valve is open; a third cylinder volume $V_{IVO}$ when the intake valve is open; and a fourth cylinder volume $V_{IVC}$ when the intake valve is closed.

* * * * *